United States Patent Office 2,894,973
Patented July 14, 1959

2,894,973

THIOPHOSPHORIC ACID ESTERS AND THEIR PRODUCTION

Gerhard Schrader, Opladen, Germany, assignor to Farbenfabriken Bayer Aktiengesellschaft, Leverkusen, Germany, a corporation of Germany No Drawing. Application September 5, 1956
Serial No. 607,996

Claims priority, application Germany September 7, 1955

4 Claims. (Cl. 260—461)

This invention relates to new and useful phosphoric acid esters of the following formula:

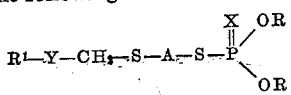

in which R and $R^1$ stand for alkyl (especially lower alkyl) and aryl (especially phenyl) groups, X and Y stand for oxygen or sulfur and A means a lower alkylene, especially an ethylene chain.

Thio- and dithiophosphoric acid esters are known to be used as pesticides and many of these compounds exhibit remarkable insecticidal properties which make them also very important in the plant protecting field. Many compounds of this class also exhibit inner therapeutic properties and insecticides of this kind are called systemic. Exhaustive research in this field, thus, becomes more and more important, since phosphoric acid esters with special outstanding properties or also with lower toxicity are always needed.

The main object of the present invention is, therefore, to provide a new class of phosphoric acid esters, useful in the field of insecticides or plant protecting agents.

Another object is to provide a method to prepare these compounds, still further objects will become apparent as the following description proceeds.

In accordance with the present invention it has been found, that compounds of the above formula may be obtained by reacting alkyl- or aryl-mercapto-(or alkoxy- or aryloxy-) methyl-β-halo-alkyl-mercaptans with salts of O,O-diesters of thiol- (or thiono-thiol-) phosphoric acids. This reaction may typically be shown by the following equation, using (methyl-mercapto-methyl-)-(β-chloroethyl-) mercaptan and the ammonium salt of O,O-dimethyl-thiol-phosphoric acid as the starting materials.

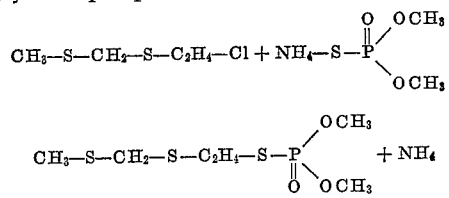

Instead of the methylmercaptomethyl compound, however, also the corresponding lower alkyl (e.g. ethyl-, propyl-, butyl-,) aryl (e.g. phenyl-) and cycloalkyl (e.g. cyclopentyl and -hexyl) mercaptomethyl compounds may be used. On the other hand, also the β-chloroethyl part of this compound is given by illustration only and instead of the β-chloro compounds also the corresponding bromo-ethyl, 2-chloro-propyl-, 2-bromo-propyl-, 2-chloro-butyl, 2-bromo-butyl, etc. compounds may be used. Instead of the ammonium salt of the thiophosphoric ester also other salts such as alkali metal salts, especially the sodium or potassium salts, may be used. Also the corresponding thiol-thiono-ester salts may be used and at last also other thiophosphoric acid esters, such as the ethyl-, propyl-, butyl-, phenyl- or cyclohexyl ester, are useful reactants according to the present invention.

The mercaptans used for the process of the present invention can be prepared analogous to methods known by the art for example by reacting a β-chloroalkyl mercaptan with chloro-methyl-alkyl- or aryl ethers resp. thioethers at elevated temperatures.

The reaction is generally carried out in inert solvents such as liquid alcohols, ketones, hydrocarbons, etc. Especially suitable are lower alcohols or lower ketones such as methanol, ethanol, acetone, methylethylketone, etc. Other suitable solvents are e.g. benzene, toluene, acetonitrile, dimethylformamide, etc. As solvents for the thiol- or thiono-thiol-phosphoric-acid-ester salts, also water may be used as an inert solvent. The temperature range within the reaction should be carried out within wide limits, e.g. between 0° C. and 150° C. More conveniently, the temperature range may be between about 50° and 100° C.

The compounds of this invention may be widely used as pesticides and plant protecting agents. They are effective against pests such as flies, aphids, mites, etc. Some of the new compounds exhibit remarkable ovicidal properties, e.g. against eggs of red mites. Furthermore, compounds of this invention show inner therapeutic properties, thereby being valuable as so called systemic insecticides. Generally, the compounds of the present invention may be used in dilution or solution with solid carriers such as talc, chalk, bentonite, etc. or liquid carriers, such as water, alcohols, ketones, liquid hydrocarbons, etc. They may furthermore be used in combination with other known insecticides, fungicides, miticides or generally pesticides. The effective amount varies in a concentration range from about 0.0001% to about 1%, but even lower or higher concentrations may be used. It is also possible to apply the inventive compounds as aerosols or to bring them in any way in contact with pests or also with the plants to be protected.

The following examples illustrate this invention, however, without limiting it thereto.

Example 1

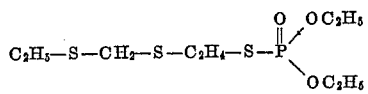

38 grams of the ammonium salt of O,O-diethyl-thiol-phosphoric acid are dissolved in 120 ml. of methylethylketone. While stirring, there are added at a temperature of about 85° C., 40 grams of (ethyl-mercapto-methyl-)-(β-chloroethyl-) mercaptan. After further heating at 85° C. for two hours the reaction mixture is cooled and filtered from the precipitated ammonium chloride. The solvent then is distilled off and the remaining residue is taken up in 105 cc. of chloroform and twice washed with 20 cc. of ice water. The solution is dried over sodium sulfate and the chloroform evaporated. The remaining residue is distilled at 0.05 mm. Hg at 150° C. There are obtained 30 grams.

This ester exhibits remarkable inner therapeutic properties and kills aphids and spidermites in a concentration of 0.001% completely.

The (ethylmercaptomethyl)-(β-chloroethyl-) mercaptan can be obtained as follows:

23 grams of chloromethyl-thioethyl ether are heated with 20 grams of β-chloroethylmercaptan for 15 minutes at about 80° C. The reaction proceeds with evolution of hydrochloric acid. Thereafter the reaction product is fractionated. The (ethylmercaptomethyl-)-(β-chloroethyl-) mercaptan is obtained as a water insoluble colorless oil boiling at 2 mm. Hg at 81° C. Yield 25 grams.

Example 2

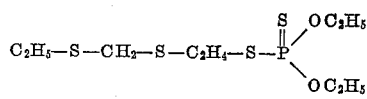

41 grams of the ammonium salt of O,O-diethyl-dithiophosphoric acid are dissolved in 100 ml. of methylethylketone. At a temperature of about 70° C. there are added while stirring, 41 grams of (ethylmercaptomethyl)-(β-chloroethyl-) mercaptan. The reaction mixture is kept at 85° C. for further 2½ hours. After cooling, the solution is filtered from precipitated ammonium salts and the solvent is distilled off. The further purification procedure proceeds according to the description of the foregoing example. There are obtained 40 grams of the new ester, boiling at 0.01 mm. Hg at 195° C. This ester kills aphids at a concentration of 0.001% and spidermites at 0.0001%. It is also very efficient against eggs of red mites.

If instead of (ethylmercaptomethyl)-(β-chloroethyl)-mercaptan the same amount of (phenoxy-methyl)-(β-chloroisopropyl)-mercaptan is used, there is obtained the ester of the formula:

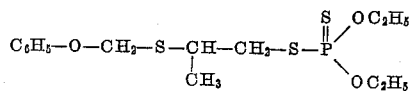

I claim:

1. A thiophosphoric acid ester of the following formula:

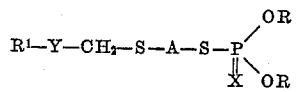

in which R and R¹ stand for a member selected from the group consisting of lower alkyl and phenyl-radicals, X and Y stand for a group VI element having a molecular weight between 16 and 32 and A stands for an ethylene chain.

2. A thiophosphoric acid ester of the following formula:

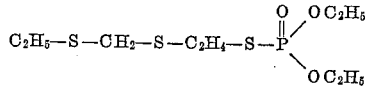

3. A thiophosphoric acid ester of the following formula:

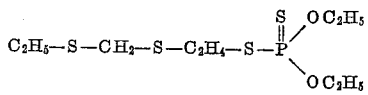

4. A thiophosphoric acid ester of the following formula:

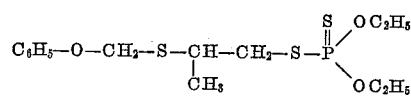

References Cited in the file of this patent

UNITED STATES PATENTS

| | | |
|---|---|---|
| 2,571,989 | Schrader | Oct. 16, 1951 |
| 2,597,534 | Schrader | May 20, 1952 |